(12) United States Patent
Briggs et al.

(10) Patent No.: US 8,489,647 B2
(45) Date of Patent: Jul. 16, 2013

(54) USE-CASE BASED CONFIGURATION OF AN OBJECT-RELATIONAL MAPPING FRAMEWORK

(75) Inventors: Mario D. S. Briggs, Bangalore (IN); Ganesh K. Choudhary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/873,180

(22) Filed: Aug. 31, 2010

(65) Prior Publication Data
US 2012/0054227 A1    Mar. 1, 2012

(51) Int. Cl.
G06F 17/30    (2006.01)

(52) U.S. Cl.
CPC .................. *G06F 17/30595* (2013.01)
USPC ............ 707/802; 707/769; 707/770; 707/829

(58) Field of Classification Search
CPC .............................................. G06F 17/30595
USPC ................................. 707/769, 770, 802, 829
See application file for complete search history.

(56) References Cited

U.S. PATENT DOCUMENTS

| 7,502,777 | B2 | 3/2009 | Lutterkort | |
| 7,958,080 | B2* | 6/2011 | Kumar et al. | 706/62 |
| 2002/0049815 | A1* | 4/2002 | Dattatri | 709/206 |
| 2003/0033517 | A1 | 2/2003 | Rutherglen et al. | |
| 2003/0135523 | A1 | 7/2003 | Brodersen et al. | |
| 2005/0165802 | A1 | 7/2005 | Sethi et al. | |
| 2008/0134136 | A1* | 6/2008 | Petersen | 717/104 |
| 2008/0134137 | A1* | 6/2008 | Petersen | 717/104 |
| 2008/0177716 | A1 | 7/2008 | Hejlsberg et al. | |
| 2009/0248621 | A1 | 10/2009 | Dageville et al. | |
| 2012/0036462 | A1* | 2/2012 | Schwartz et al. | 715/771 |

OTHER PUBLICATIONS

Martynas Jusevicius, "Eager fetching and Select N+1 problem", xml.lt: Blog, Oct. 22, 2007, <<http://www.xml.lt/Blog/2007/10/22/Eager+fetching+and+SELECT+N%2B1+problem>>.
Sebastijan Pistotnik, "NConstruct and ORM in Adventure Works database", Mar. 2008, <<http://www.nconstruct.com/AdventureWorks-And-NConstruct.aspx>>.
Alois Reitbaur, "Showing posts with label: Hibernate", Application Performance, Scalability and Architecture: The blog of dynaTrace's Technology Strategists, dates ranging from Feb. 16, 2009 to Nov. 12, 2009, <<http://blog.dynatrace.com/tag/hibernate/>>.
Alois Reitbauer and Andreas Grabner, "Showing posts of category: Java", Application Performance, Scalability and Architecture: The blog of dynaTrace's Techonology Strategists, dates ranging from May 29, 2009 to Nov. 12, 2009, <<http://blog.dynatrace.com/category/java/>>.
"NHibernate Profiler Delivers!", NHibernate Profiler: Real-time visual debugger for NHibernate, Nov. 9, 2009, <<http://nhprof.com/>>.
SQL Transactions 101, Simply Gold, retrieved Oct. 12, 2009, from <<www.nikhedonia.com/notebook/entry/sql-transactions-101/>>.

(Continued)

*Primary Examiner* — Shahid Alam
(74) *Attorney, Agent, or Firm* — Patterson & Sheridan, LLP (57) ABSTRACT

Systems, methods, and computer program products are disclosed for configuring an object-relational mapping framework. The object-relational mapping framework may monitor, in the context of a use case of an application, fetching of data from a relational database and accessing of the fetched data by the application. The object-relational mapping framework may be configured based on the monitored activity.

18 Claims, 6 Drawing Sheets

OTHER PUBLICATIONS

William Bireley et al, "Batching Heterogeneous Database Commands", U.S. Appl. No. 12/467,102, filed May 15, 2009.

Pieter Van Zyl et al., "The influence of optimisations on the performance of an object relational mapping tool", Proceedings of the 2009 Annual Research Conference of the South African Institute of Computer Scientists and Information Technologists, pp. 150-159, SAICSIT Oct. 11-14, 2009, Vanderbijl Park, South Africa.

Alois Reitbauer, "Understanding Caching in Hibernate—Part One: The Session Cache", Application Performance, Scalability and Architecture: The blog of dynaTrace's Technology Strategists, Feb. 16, 2009, <<http://blog.dynatrace.com/2009/02/16/understanding-caching-in-hibernate-part-one-the-session-cache/>>.

Alois Reitbauer, "Understanding Caching in Hibernate—Part Two: The Query Cache", Application Performance, Scalability and Architecture: The blog of dynaTrace's Technology Strategists, Feb. 16, 2009, <<http://blog.dynatrace.com/2009/02/16/understanding-caching-in-hibernate-part-two-the-query-cache/>>.

Alois Reitbauer, "Understanding Caching in Hibernate—Part Three: The Second Level Cache", Application Performance, Scalability and Architecture: The blog of dynaTrace's Technology Strategists, Mar. 24, 2009, <<http://blog.dynatrace.com/2009/03/24/understanding-caching-in-hibernate-part-three-the-second-level-cache/>>.

* cited by examiner

USE-CASE BASED CONFIGURATION OF AN OBJECT-RELATIONAL MAPPING FRAMEWORK

BACKGROUND

1. Field

Embodiments of the invention relate generally to techniques for object-relational mapping and more specifically to configuring an object-relational mapping framework.

2. Description of the Related Art

Databases are computerized information storage and retrieval systems. The most prevalent type of database is the relational database, a tabular database in which data is defined so that it can be reorganized and accessed in a number of different ways.

Regardless of the particular architecture, in a database management system (DBMS), a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

SUMMARY

Embodiments of the invention provide a computer-implemented method, computer program product, and system for performing an operation during execution of an application that accesses a relational database using an object-relational mapping (ORM) framework. The operation also includes monitoring activity comprising: (i) fetching of data from the relational database by the ORM framework for a use case of the application and (ii) accessing of the fetched data by the use case of the application, wherein the use case represents a unit of work performed by the application. The operation also includes configuring a manner in which the ORM framework fetches data from the relational database, based on the monitored activity, during execution of the application and without having to restart the application.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide techniques for bridging an object-relational impedance mismatch between a relational model and an object-oriented model. The object-relational impedance mismatch arises from differences in how data is represented under the relational model and under the object-oriented model. Under the relational model, data is exposed in the form of tables having rows and columns and according to a relational schema that specifies the structure of the tables and relationships between the tables. Under the object-oriented model, data is exposed in the form of a collection of interacting objects that exhibit object-oriented characteristics, such as inheritance and polymorphism. As is known, inheritance refers to a process in which a class inherits state and behavior of another class, thereby giving rise to a hierarchy of classes. Polymorphism refers an ability of objects belonging to different types to respond to function calls of the same name while providing distinct, type-specific behavior. Polymorphism also provides that the exact type of the object need not be known in advance; instead, the behavior of the object may be determined at run-time.

To bridge the impedance mismatch between the relational model and the object-oriented model, an object-relational mapping (ORM) framework is provided and used by an application to access data stored in a relational database. The ORM framework automates data conversions from the relational model to the object-oriented model—and vice versa. Accordingly, by using the ORM framework, the developer of the application need not write any source code for performing the data conversions. As a result, the productivity in developing the application may be improved.

In one embodiment, during execution of the application, the ORM framework may configure how the ORM framework fetches data from the relational database. In doing so, performance of the application and/or of the relational database may be improved. The configuration of the ORM framework occurs without requiring any restart of the application. Further, the configuration of the ORM framework may vary dynamically over time, to suit a corresponding use case of the application, where the use case also varies dynamically over time. Each use case of the application represents a distinct logical unit of work that is being performed by the application. Each use case may be defined by a developer of the application and uniquely identified by the ORM framework during execution of the application. Further, each use case of the application may be correlated with a distinct pattern of fetching and/or accessing data. Accordingly, dynamically configuring of the ORM framework based on each occurring use case may result in improved performance of the application and/or the relational database. In particular, the performance may be improved relative to applying a single configuration of the ORM framework to all use cases of the application. Further, the developer of the application need not attempt to determine a suitable configuration of the ORM framework for each use case of the application, from sifting through voluminous amounts of stack trace information, which can be tedious and error-prone in some cases.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
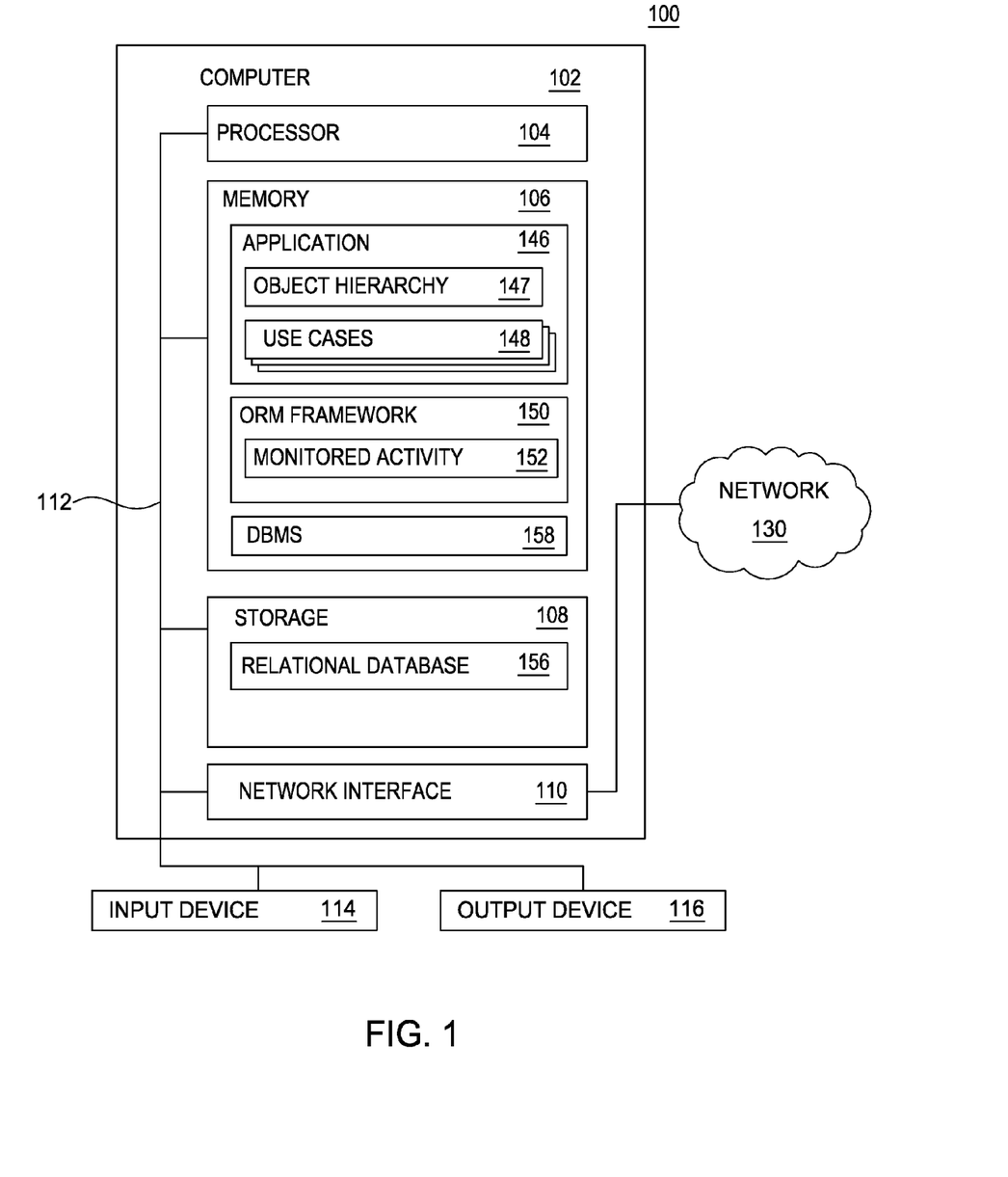
FIG. 1 is a block diagram illustrating a system for configuring an ORM framework, according to one embodiment of the invention.

FIG. 1 is a block diagram illustrating a system 100 for configuring an ORM framework, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 146. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 146, an ORM framework 150, and a DBMS 158. The storage 108 of the computer 102 includes a relational database 156. The DBMS 158 manages the relational database 156. The ORM framework 150 communicates with the DBMS 158 to retrieve data from the relational database 156. The ORM framework 150 also converts data between the relational model and the object-oriented model. The application 146 may be any object-oriented application that accesses data stored in the relational database 156. By using the ORM framework 150 to access the data stored in the relational database 156, the application 146 need not include code for converting data between the object-oriented model and the relational model; instead, such conversions are provided by the ORM framework 150. Depending on the embodiment, some or all of the functionality of the ORM framework 150 may be integrated into the DBMS 158.

As shown, the application 146 includes an object hierarchy 147 and use cases 148. The object hierarchy 147 defines the types of objects used by the application 146 and defines relationships between the objects. Depending on the embodiment, the object hierarchy may include only one root object or multiple root objects. Each type of object (or class of object) is represented as a node in the object hierarchy 147 and each relationship is represented as an edge in the object hierarchy 147. Depending on the embodiment, on or more objects (rather than types) may also be represented in the object hierarchy 147. The object hierarchy 147 may also be referred to as a domain model for the application 146 and may correspond to a Unified Modeling Language (UML) class diagram or object diagram. As described above, the use cases 148 each represent a distinct, logical unit of work performed by the application 146, and each of the use cases 148 may be defined by a developer of the application 146 and identified by the ORM framework 150. In one embodiment, each use case 148 causes at least one query to be issued against the relational database 156. However, a use case 148 may often cause multiple queries to be issued.

In one embodiment, relationships between objects in the object hierarchy may include different types of relationships used in domain modeling. Types of relationships used in domain modeling may include, without limitation, association, composition, aggregation, generalization, realization, dependency, and multiplicity. In domain modeling, an association represents a relationship between two associated classes (e.g., classes that interact with one another). For example, to model academic departments offering academic courses, the object hierarchy may include an "Offers" relationship between a Department class and a Course class. Aggregation represents a relationship in which a first object is part of a second object, where the life cycle of the first object is not dependent on the life cycle of the second object. Composition represents a relationship in which in which a first object is part of a second object, where the life cycle of the first object depends on the life cycle of the second object. Generalization represents a relationship in which a first class is considered to be a generalized form of a second class. Depending on the embodiment, generalization represents inheritance between classes. For example, a Mammal class may be considered a generalized form of a Human class. Realization represents a relationship between an interface class and a component class, in which functionality defined in the interface is realized by the component. Dependency represents a relationship between a first class and a second class, where the first class uses the second class during execution of the application 146. For example, the second class may be a parameter variable or local variable of a method of first class. Further, one or more of the relationships described above may include an indicator of multiplicity, which specifies whether the relationship is one-to-one, one-to-many, or many-to-many relationship, etc.

As shown, the ORM framework 150 includes monitored activity 152. The monitored activity 152 represents: (i) fetching of data from the relational database 156 by the ORM framework 150 and/or (ii) accessing of the fetched data by the application 146, as monitored by the ORM framework 150. In some embodiments, the ORM framework 150 may monitor activity for a predefined period of time. The period of time may be specified by a user such that the amount of the monitored activity is deemed by the user to be sufficient for use in configuring the ORM framework 150. Based on the monitored activity 152, the ORM framework 150 configures itself to fetch data from the relational database 156 in a manner that improves performance of the application 146 and/or the relational database 156. In an alternative embodiment, an application separate from the ORM framework 150 configures the ORM framework, based on the monitored activity 152.

In one embodiment, an ORM framework 150 may fetch data from the relational database 156 in different ways, in terms of when the data is fetched. For example, the ORM framework 150 may fetch data either "eagerly" or "lazily". Fetching data eagerly refers to fetching the data from the relational database 156, prior to receiving any request from the application 146 for the data (i.e., proactively). On the other hand, fetching data lazily refers to fetching the data from the relational database 156 only upon receiving a request from the application 146 for the data (i.e., responsively). Stated another way, fetching data lazily refers to refraining from fetching data from the relational database 156 until the data is explicitly requested by the application 146. The data being fetched and/or requested may correspond to one or more nodes of the object hierarchy 147. Depending on the embodiment, whether to fetch data eagerly or lazily may be a global setting for all nodes of the object hierarchy 147 for a given use case or a local setting specific only to one or more nodes of the object hierarchy 147 for the given use case. In the latter embodiment, each distinct use case may specify a lazy/eager fetch setting for each individual node of the object hierarchy 147. By tailoring behavior of the ORM framework 150 at a use-case level and object-level, performance of the application 146 and/or the relational database 156 may be improved.

In one embodiment, an ORM framework 150 may fetch data from the relational database 156 in different ways, in terms of how the data is fetched. For example, the ORM framework 150 may fetch data either by using individual selects or joins in queries issued against the relational database 156. Using individual selects to fetch data refers to issuing a separate query for each row in each table in the relational database 156. On the other hand, using joins to fetch data refers to issuing a single query to retrieve data from all of the desired tables, where the single query joins the desired tables together. Further, each node of the object hierarchy 147 may have a respective setting that specifies to fetch data using either individual selects or joins for the respective node. Further still, the developer of the application 146 may specify a relationship between the how and the when to fetch data from the relational database 156. For example, the developer may specify that for a given level of the object hierarchy 147, the ORM framework 150 can use joins only if the ORM framework 150 is fetching eagerly.

As described above, in one embodiment, the manner in which the ORM framework 150 fetches data from the relational database 156 affects performance of the application 146 and/or the relational database 156. Performance of the relational database 156 is improved when the count of queries issued against the relational database 156 is minimized. Further, performance of the application 146 and/or the relational database 156 is improved when the amount of data retrieved from the relational database 156 is minimized. Some undesirable configurations of the ORM framework 150, however, may significantly impair performance. For example, the undesirable configurations of the ORM framework 150 may result in an "N+1 selects problem" or a "Cartesian product problem".

To facilitate understanding of the N+1 selects problem, suppose the application 146 desires to retrieve a listing of all orders associated with all customer accounts. Suppose that accounts and orders are stored in respective tables in the relational database 156, and that there are N customer accounts in total. The N+1 selects problem occurs when the ORM framework 150 issues a single query to retrieve all customer accounts, followed by an additional query to retrieve orders for each customer account (for a total of N additional queries, which results in a total of N+1 queries altogether). Issuing such a large number of queries to the relational database 156 may impair performance relative to issuing a single query that specifies to join desired tables together (e.g., the accounts table and the orders table in this particular example). Because the application does not issue queries directly but instead uses the ORM framework 150 to retrieve desired data, it may be difficult for the developer to determine whether a given object-oriented source code for the application 146 will result in the N+1 selects problem occurring between the ORM framework 150 and the relational database 156. The likelihood of the N+1 selects problem occurring may be reduced by configuring the ORM framework 150 using techniques described in more detail below.

To illustrate the Cartesian product problem, suppose that the ORM framework 150 issues a single query that joins the orders table and accounts table together, without any join constraint. Suppose further that there are M orders in total. The Cartesian product problem occurs when the ORM framework 150 issues a single query to retrieve all orders associated with all customer accounts, without any join constraint relating the orders to the accounts. As a result, the ORM framework 150 may cause a total of N×M records to be returned from the relational database 156, where the returned records contain mostly redundant information. Fetching such a large amount of mostly-redundant data from the relational database 156 may impair performance. Further, because the application does not issue queries directly but instead uses the ORM framework 150 to retrieve desired data, it may be difficult for the developer to determine whether a given object-oriented source code for the application 146 will result in the Cartesian product problem occurring between the ORM framework 150 and the relational database 156. The likelihood of the Cartesian product problem occurring may be reduced by configuring the ORM framework 150 using techniques described in more detail below. Further, the above problems—i.e., the N+1 selects problem and the Cartesian product problem—are merely illustrative of two problems that may be addressed by embodiments of the invention. Other problems may also, or alternatively, be addressed.

As described above, in one embodiment, each use case 148 of the application 146 causes at least one query to be issued against the relational database 156. The application 146 may include multiple use cases 148 that each access the same portion (of one or more nodes) of the object hierarchy 147. Even among the multiple use cases 148, there may be a node in the portion that is used in a first use case but not used in a second use case. If the second use case does not access the node in the portion, then the ORM framework 150 should be configured to fetch data lazily for the node, thereby improving performance for the second use case. However, if the first use case accesses the node in the portion along with all children of the node, then the ORM framework 150 should be configured to fetch data eagerly and using join for the node, thereby improving performance for the first use case. Accordingly, the ORM framework 150 may dynamically configure itself based on the use case determined to be occurring. In so doing, performance may be improved, relative to setting a configuration for the node that applies across all use cases and without requiring the developer of the application 146 to attempt to determine a suitable configuration of the ORM framework for each use case of the application 146.

Figure 2:
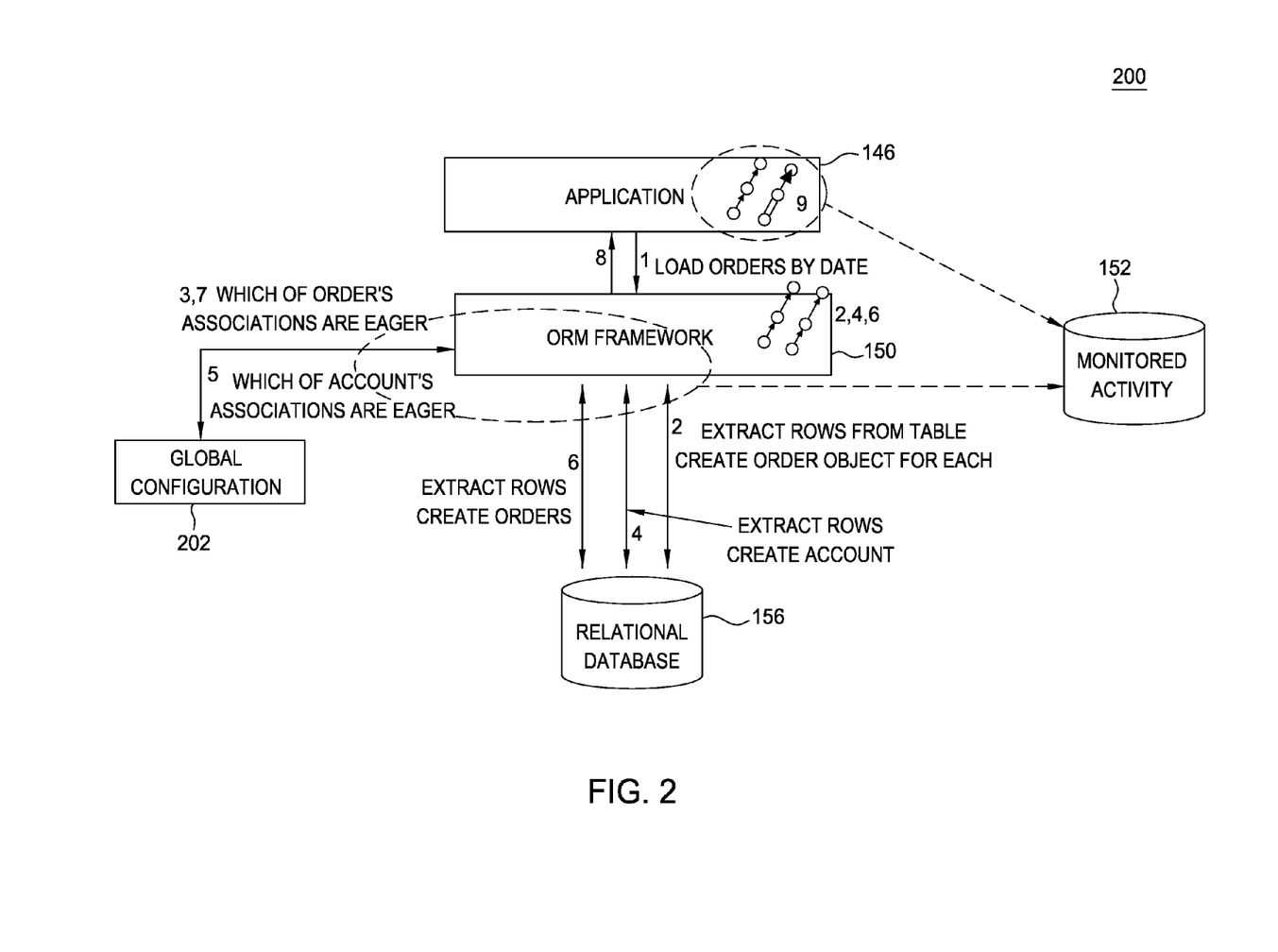
FIG. 2 illustrates an exemplary system for monitoring activity for the ORM framework, according to one embodiment of the invention.

FIG. 2 illustrates an exemplary system 200 for monitoring activity for the ORM framework of FIG. 1, according to one embodiment of the invention. As shown, the system 200 includes the application 146, the ORM framework 150, the relational database 156, the monitored activity 152 stored by the ORM framework 150, and a global configuration 202. The application 146 uses the ORM framework 150 to access the relational database 156. While not shown in FIG. 2, it is understood that the ORM framework 150 may access the relational database 156 via the DBMS 158. As shown, the application 146 sends a message to the ORM framework 150, instructing the ORM framework 150 to load orders by date. The ORM framework 150 then extracts rows from a table in the relational database 156 and creates an Order object for each row.

Next, the ORM framework 150 determines which associations of Order are fetched eagerly. Further, the ORM framework 150 extracts rows for the Account object, creates an account and determines which associations of Account are fetched eagerly. The ORM framework 150 then extract rows for the Order object and create additional Order objects. The ORM framework 150 then determines which associations of Order are fetched eagerly. The application 146 may then access the fetched and converted data. However, not all of the data fetched by the ORM framework 150 is necessarily used by the application 146. To the extent that fetched data is not used by the application 146, performance of the application 146 and/or the relational database 156 may be impaired. To improve performance, the ORM framework 150 may apply a configuration that is specific to a use case of the application 146.

Figure 3:
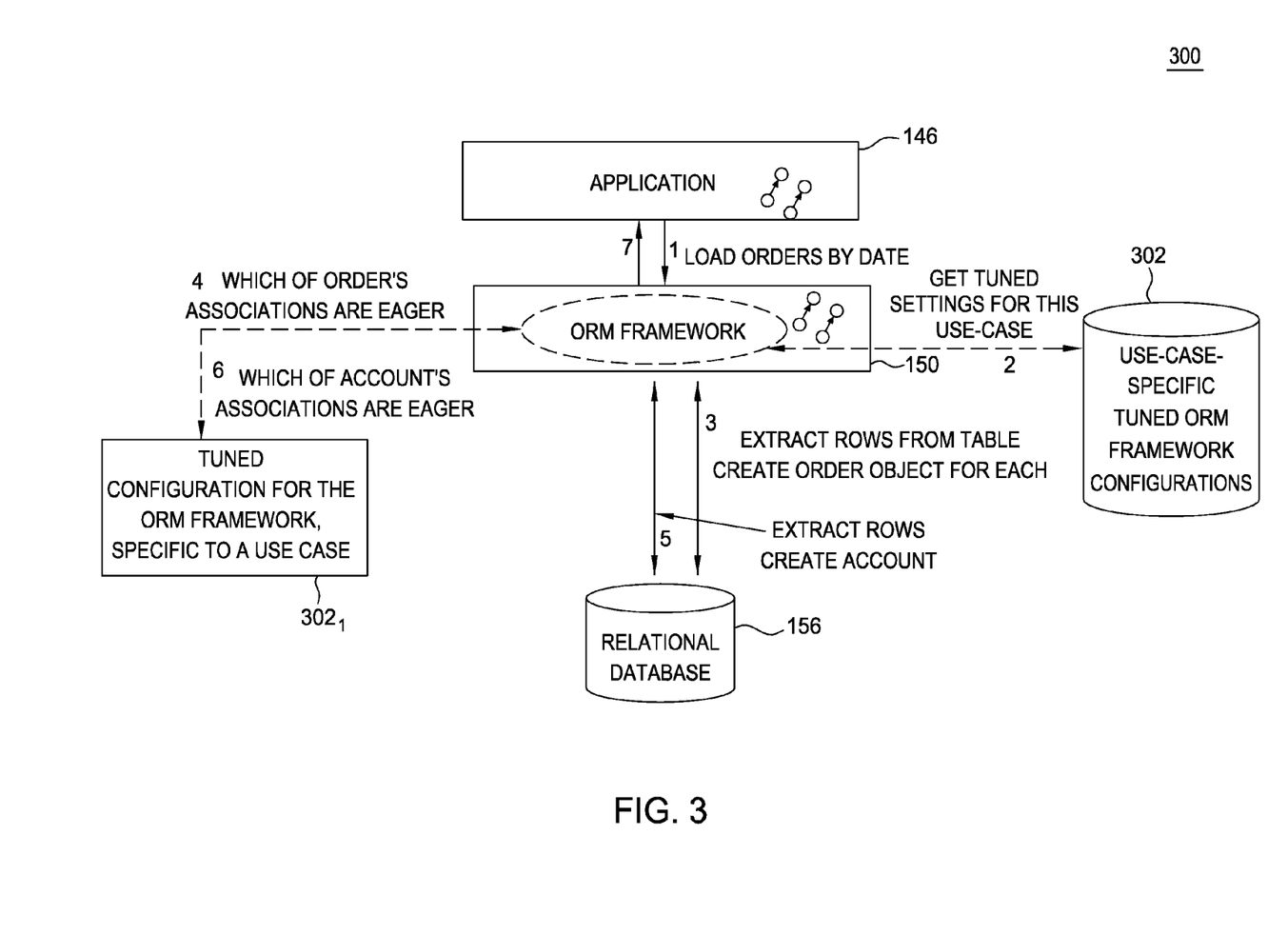
FIG. 3 illustrates an exemplary system for configuring the ORM framework, according to one embodiment of the invention.

FIG. 3 illustrates an exemplary system 300 for configuring the ORM framework 150 of FIG. 1, according to one embodiment of the invention. As shown, the system 300 includes the application 146, the ORM framework 150, the relational database 156, and use-case-specific, tuned ORM framework configurations 302. As shown, the application 146 sends a message to the ORM framework 150, instructing the ORM framework 150 to load orders by date. The ORM framework 150 then retrieves a configuration specific to the current use case of the application 150. The ORM framework 150 then extracts rows from a table in the relational database 156 and creates an Order object for each row.

Next, the ORM framework 150 determines which associations of Order are fetched eagerly. Further, the ORM framework 150 extracts rows for the Account object, creates an account and determines which associations of Account are fetched eagerly. The application 146 may then access the fetched and converted data. By dynamically applying a configuration that is specific to the current use case of the application 146, performance of the application 146 and/or the relational database 156 may be improved.

As described above, in one embodiment, the ORM framework 150 monitors activity of the ORM framework 150 and/or the application 146 on a use-case-specific basis, where the activity includes: (i) fetching of data from the relational database 156 by the ORM framework 150 and/or (ii) accessing of the fetched data by the application 146. By monitoring the activity on a use-case-specific basis, the ORM framework 150 identifies relationships between multiple queries issued in a single use case of the application 146. The ORM framework 150 uses the identified relationships to determine a configuration better suited to the use case. For example, the ORM framework 150 may detect the duplicate fetch of objects across queries within a single use case. In response, the ORM framework 150 may reconfigure itself to fetch the objects only once. Accordingly, the second fetch of the objects is eliminated, thereby improving performance of the application 146 and/or the relational database 156.

In one embodiment, the ORM framework 150 may also monitor the context in which a particular data item is fetched. For example, the ORM framework 150 may monitor that node A is fetched in a context of node B, where node B is the parent of node A in the object hierarchy 147. By monitoring the context in which data items are fetched, the ORM framework 150 may determine configurations suited for object hierarchies having objects with bidirectional relationships. For example, two objects have bidirectional relationships when each of the objects provides an operation for retrieving the other object. Further, monitoring the context in which data items are fetched allows the ORM framework 150 to determine configurations suited for a shared object type. For example, an object type, such as an Address object, may be shared between an Employee object and a Customer object. In other words, both the Employee object and the Customer object include a method to retrieve an Address object. Monitoring the context of a load of the Address object in a use case of the application 146 allows the ORM framework 150 to determine a configuration that is better suited to the use case of the application 146.

In one embodiment, the ORM framework 150 may also monitor a primary key of a fetched object that is accessed by the application 146, as stored in the relational database 156. By monitoring the primary key of a fetched object, the ORM framework 140 may detect an application 146 accessing the same object repeatedly. For example, suppose the ORM framework 150 loads eight hundred objects for the application 146, but the application 146 only uses one of the objects eight hundred times. Such behavior of the application 146 may suggest that the application 146 is not tuned correctly and/or contains an error. A developer of the application 146 may be provided the monitored information to aid the developer in tuning and/or correcting any error in the application 146.

In one embodiment, using the monitored activity 152, the ORM framework 150 may configure the manner in which the ORM framework 150 fetches data from the relational database 156. For example, the ORM framework 150 may determine, for a given use case, which nodes of data are fetched by the ORM framework 150 but are not used by the application 146. The ORM framework 150 may then configure the ORM framework 150 to fetch data lazily for the determined nodes, thereby avoiding fetching more data than the application 146 actually uses. As another example, the ORM framework 150 may determine, for a given use case, which nodes of data are accessed by the application 146 and are fetched lazily, using individual selects by the ORM framework 150. The ORM framework 150 may then configure the ORM framework 150 to fetch data eagerly and with joins for the determined nodes, thereby avoiding problems such as the N+1 selects problem.

In one embodiment, upon determining a configuration change to the ORM framework 150 for a given use case, the ORM framework 150 identifies and applies the configuration change upon detecting a subsequent execution of the given use case, without requiring a restart of the application 146. To this end, the ORM framework 150 may identify that the subsequent execution of the given use case matches a previous execution of the given use case. The ORM framework 150 may also apply the configuration change for the subsequent execution of the given use case. For example, the ORM framework 150 may modify the manner in which data is retrieved for certain nodes in the object hierarchy deemed to be accessed (or otherwise) in the given use case.

In one embodiment, the particular configuration change may also depend on a maximum fetch depth of the object hierarchy. For example, the ORM framework 150 may monitor an actual depth to which the object hierarchy is accessed by the application 146. The ORM framework 150 may then set the value of the maximum fetch depth to be the actual depth, upon detecting subsequent executions of the use case. The maximum fetch depth may be used to control the amount of data retrieved from the relational database 156 and may refer to a number of levels in the object hierarchy that a single query is allowed to retrieve data for.

In one embodiment, the configuration of the ORM framework 150 may include other parameters that are use-case specific. For example, the ORM framework 150 may set a maximum batch size for a given use case. The maximum batch size specifies a maximum count of queries for being issued and/or processed as a single batch against the relational database 156.

As described above, in one embodiment, the ORM framework 150 monitors fetching of data by the ORM framework 150, along with the respective context. To this end, the ORM framework 150 includes a data access layer and a controller layer. The data access layer executes queries against the relational database 156, while the controller layer that directs the fetching of data from the relational model to the requested object hierarchy. An exemplary object hierarchy is shown in Table I.

TABLE I

OBJECT HIERARCHY EXAMPLE class Account
{       BigDecimal balance;
        List<Order> orders;
        . . .
}
class Order
{       String completeStatus;
        Account account;
        . . .
}

As shown, the object hierarchy includes two types of objects: Account and Order. Each Account object includes a list of associated orders, and each Order object includes a link to the associated account. The controller layer directs fetching of either an order or an account from the relational database 156 and specifies the context in which the order or the account is being loaded. For example, the controller layer specifies whether an account is being fetched in the context of an order or, similarly, whether an order is being fetched in the context of an account. Further, the controller layer executes operations within a use case of the application, where the use case is implemented by using sessions. Specifically, boundaries of the use case are demarcated by operations to open a session and to close a session, respectively. In other words, use-case boundaries are identified using boundaries of a corresponding session. Accordingly, the ORM framework 150 logs indications of monitored activity regarding accounts and orders (along with the respective context).

As described above, in one embodiment, the ORM framework 150 monitors accessing of fetched data by the application 146, along with the respective context. The ORM framework 150 determines that fetched data is accessed by the application 146 upon detecting that a method of a particular class in the object hierarchy is invoked. For example, if the method Order.getAccount is invoked, then the ORM framework 150 determines that the application 146 has used the account data in the context of the order. Accordingly, the ORM framework 150 logs indications of monitored activity regarding method invocations in the object hierarchy. To monitor and log actual usage of data by the application 146 within a specific use case, the developer may apply bytecode enhancement to the object model classes. This produces object model classes augmented with custom code. The custom code includes an additional member variable (as a session) to each domain model class. The controller layer instantiates the member variable with a value immediately upon the object is instantiated with a row of data from the relational database 156. Accordingly, the ORM framework 150 may monitor and log usage of data by the application 146.

In one embodiment, the ORM framework 150 analyzes the monitored activity 152 to determine, for each use case, a fetch count comprising how many objects of a given type are fetched and what is the parent object of the fetched objects. For example, the ORM framework 150 determines a count of accounts fetched in the context of an order. The ORM framework 150 also determines how a usage count comprising how many method invocations occur for the respective use case. For example, the ORM framework 150 determines a count of invocations of the method order.getAccount. The difference between the fetch count and the usage count indicates an extent to which fetched data in the ORM framework 150 went unused by the application 146.

In one embodiment, the ORM framework 150 (re-)configures itself based on the difference between the fetch count and the usage count. If the difference amounts to less than a first predefined percentage of the fetch count, and if the ORM framework 150 is configured to lazily fetch account data from the order context, the ORM framework 150 may reconfigure itself to eagerly fetch the account data, with joins and/or subselects (e.g., for one-to-many relationships). Subselects refer to nesting a select query inside another select query. On the other hand, if the difference between the fetch count and the usage count exceeds a second predefined percentage of the fetch count, and if the ORM framework 150 is configured to eagerly fetch account data from the order context, the ORM framework 150 may reconfigure itself to lazily fetch the account data. The first and second predefined percentages may be user-configurable.

In one embodiment, the ORM framework 150 organizes distinct configurations by the corresponding use case of the application 146, based on stack trace information associated with the respective use case. If the ORM framework 150 determines that a particular use case yields differing configuration values across different executions of the use case, the ORM framework 150 may receive user input specifying desired configuration values (e.g., from a developer). Once the distinct configurations are organized by corresponding use case, upon detecting a subsequent execution of a use case, the ORM framework 150 matches the subsequent execution of the use case to a corresponding distinct configuration for the use case, based on stack trace information for the subsequent execution. The ORM framework 150 then applies the matched configuration for the use case.

Depending on the embodiment, the ORM framework 150 may determine configurations for all distinct use cases, prior to applying any of the determined configurations. To this end, operation of the ORM framework 150 may involve three phases: monitoring activity (for a predefined period of time), analyzing the monitored activity to determine configurations, and runtime tuning (i.e., monitoring subsequent activity to apply the configurations). In analyzing the monitored activity, the ORM framework 150 may first identify all distinct use cases of the application 146. The ORM framework 150 may then determine a corresponding configuration suited to each identified use case of the application 146. Subsequently, during runtime tuning, upon detecting that the application 146 is executing a particular use case, the ORM framework 150 may reconfigure itself with the configuration corresponding to the detected use case. In an alternative embodiment, the ORM framework 150 may determine and apply configurations dynamically—i.e., as the application 146 is executing and without having to first determine configurations for all distinct use cases of the application 146. In this alternative embodiment, two or more of the three phases (monitoring activity, analyzing the monitored activity, and runtime tuning) may be combined.

In one embodiment, applying the configuration for the use case may be implemented in various ways. For example, the ORM framework 150 may use a public application programming interface (API) provided by the ORM framework 150 to define multiple configurations and to select one of the configurations for a use case by activating the configuration at a session level of the ORM framework 150. Alternatively, the ORM framework 150 may use an internal API provided by the ORM framework 150 to manipulate a runtime instance of a data structure that contains all configuration settings for the ORM framework 150. The internal API may be used to create multiple copies of the data structure, each copy being modified to suit the corresponding use case identified by the ORM framework 150. The ORM framework 150 may then replace the first (default) instance of the data structure with one of the copies storing the configuration settings that the ORM framework 150 desires to apply.

Figure 4:
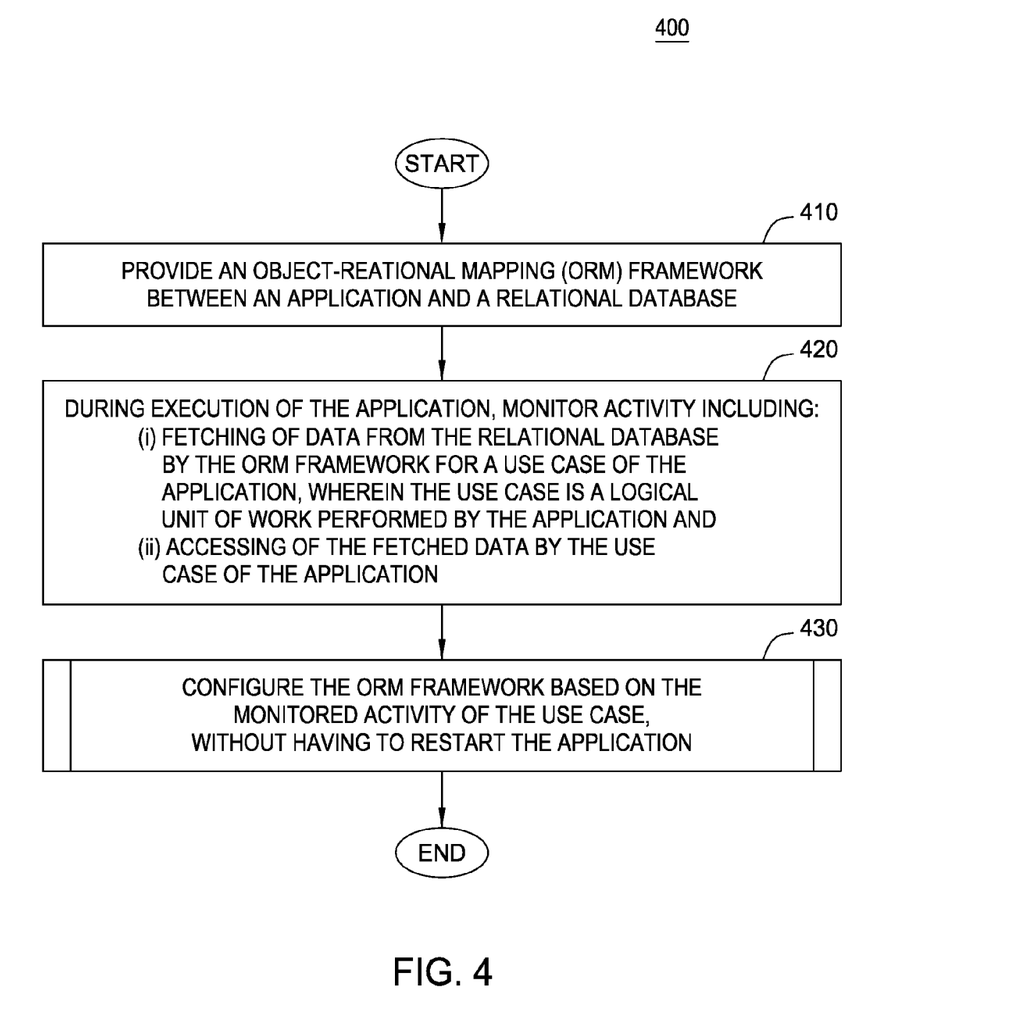
FIG. 4 is a flowchart depicting a method for configuring the ORM framework, according to one embodiment of the invention.

FIG. 4 is a flowchart depicting a method 400 for configuring the ORM framework 150 of FIG. 1, according to one embodiment of the invention. As shown, the method 400 begins at step 410, where an ORM framework 150 is provided between an application and a relational database. At step 420, during execution of the application, the ORM framework 150 monitors activity. The activity includes: (i) fetching of data from the relational database by the ORM framework 150 for a use case of the application and (ii) accessing of the fetched data by the use case of the application, wherein the use case is a logical unit of work performed by the application. At step 430 and during execution of the application, the ORM framework 150 configures itself based on the monitored activity of the use case, without having to restart the application. After the step 430, the method 400 terminates.

Figure 5:
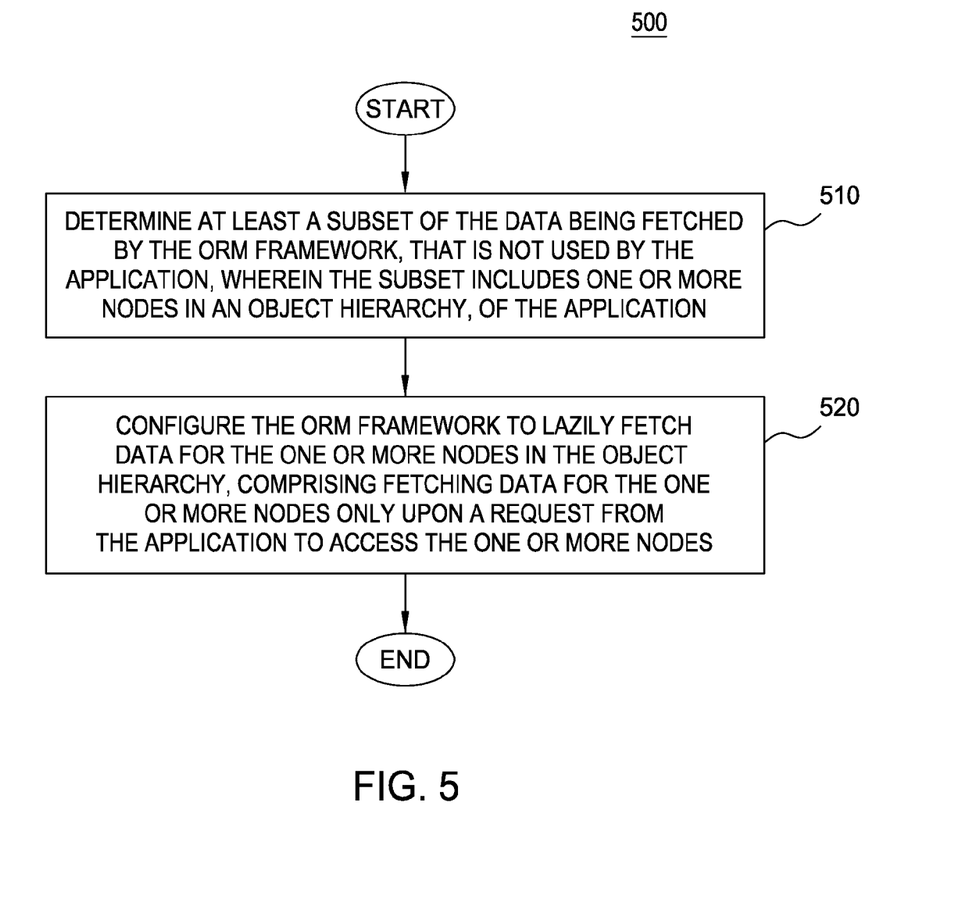
FIG. 5 is a flowchart depicting a method for configuring the ORM framework, based on the monitored activity of an application, according to one embodiment of the invention.

FIG. 5 is a flowchart depicting a method 500 for configuring the ORM framework 150 of FIG. 1, based on the monitored activity of the use case, according to one embodiment of the invention. The method 500 corresponds to the step 430 of FIG. 4. As shown, the method 500 begins at step 510, where the ORM framework 150 determines at least a subset of the data being fetched by the ORM framework 150, that is not used by the application, wherein the subset includes one or more nodes in an object hierarchy of the application. At step 520, the ORM framework 150 configures itself to lazily fetch data for the one or more nodes in the object hierarchy. Lazily fetching data includes fetching data for the one or more nodes only upon a request from the application to access the one or more nodes. After the step 520, the method 500 terminates.

Figure 6:
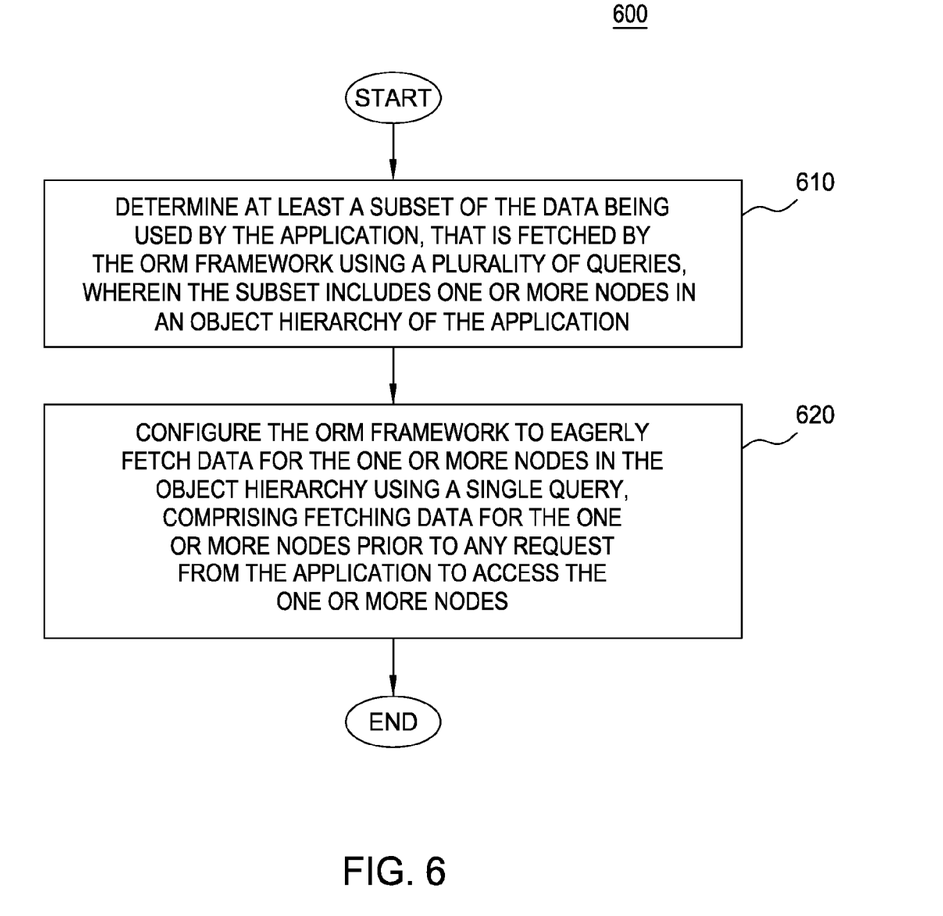
FIG. 6 is a flowchart depicting another method for configuring the ORM framework, based on the monitored activity, according to one embodiment of the invention.

FIG. 6 is a flowchart depicting a method 600 for configuring the ORM framework 150 of FIG. 1, based on the monitored activity of the use case, according to one embodiment of the invention. The method 600 also corresponds to the step 430 of FIG. 4. As shown, the method 600 begins at step 610, where the ORM framework 150 determines at least a subset of the data being used by the application, that is fetched by the ORM framework 150 using a plurality of queries, wherein the subset includes one or more nodes in an object hierarchy of the application. At step 620, the ORM framework 150 configures itself to eagerly fetch data for the one or more nodes in the object hierarchy using a single query. Eagerly fetching data includes fetching data for the one or more nodes prior to any request from the application to access the one or more nodes.

Advantageously, embodiments of the invention provide techniques for configuring an ORM framework. One embodiment of the invention provides the ORM framework between an application and a relational database. During execution of the application, the ORM framework monitors fetching of data for a use case of the application and accessing of the fetched data by the use case of the application. The ORM framework may be configured based on the monitored activity of the use case, without having to restart the application, whereby performance of the application and/or the relational database may be improved.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   monitoring, during execution of an application that accesses a relational database using an object-relational mapping (ORM) framework, activity comprising: (i) fetching of data from the relational database by the ORM framework for a use case of the application and (ii) accessing of the fetched data by the use case of the application, wherein the use case represents a unit of work performed by the application;
   determining, based on the monitored activity, at least a subset of the data being fetched by the ORM framework, that is not used by the application, wherein the subset comprises one or more nodes in an object hierarchy of the application; and
   configuring the ORM framework by one or more computer processors and without having to restart the application, to fetch data for the one or more nodes in the object hierarchy only upon a request from the application to access the one or more nodes.

2. The computer-implemented method of claim 1, wherein the ORM framework is configured only upon determining that the subset constitutes a threshold percentage of the data, wherein the threshold percentage is a user-configurable value.

3. The computer-implemented method of claim 1, further comprising:
   identifying a plurality of use cases of the application;
   wherein the use case is selected from the plurality of use cases of the application, wherein at least one of the plurality of use cases is identified based on a stack trace of the application.

4. The computer-implemented method of claim 3, wherein the stack trace of the application comprises a stack trace of a function call to open a session, wherein the session corresponds to a logical grouping of data access operations of the application, wherein the logical grouping is specified by a developer of the application.

5. The computer-implemented method of claim 1, wherein the use case is correlated with a distinct pattern of accessing the fetched data, wherein the data being fetched by the ORM framework comprises an object in an object hierarchy of the application, and wherein monitoring the data being fetched includes monitoring a context in which the data is being fetched, wherein the context comprises a parent of the object in the object hierarchy.

6. A computer program product comprising a computer-readable memory having computer-readable program code embodied therewith, the computer-readable program code comprising:

computer-readable program code configured to monitor, during execution of an application that accesses a relational database using an object-relational mapping (ORM) framework, activity comprising: (i) fetching of data from the relational database by the ORM framework for a use case of the application and (ii) accessing of the fetched data by the use case of the application, wherein the use case represents a unit of work performed by the application;

computer-readable program code configured to determine, based on the monitored activity, at least a subset of the data being fetched by the ORM framework, that is not used by the application, wherein the subset comprises one or more nodes in an object hierarchy of the application; and computer-readable program code to configure the ORM framework by one or more computer processors when executing the computer-readable program code and without having to restart the application, to fetch data for the one or more nodes in the object hierarchy only upon a request from the application to access the one or more nodes.

7. The computer program product of claim 6, wherein the ORM framework is configured only upon determining that the subset constitutes a threshold percentage of the data, wherein the threshold percentage is a user-configurable value.

8. The computer program product of claim 6, wherein the computer-readable program code further comprises:

computer-readable program code configured to identify a plurality of use cases of the application;

wherein the use case is selected from the plurality of use cases of the application, wherein at least one of the plurality of use cases is identified based on a stack trace of the application.

9. The computer program product of claim 8, wherein the stack trace of the application comprises a stack trace of a function call to open a session, wherein the session corresponds to a logical grouping of data access operations of the application, wherein the logical grouping is specified by a developer of the application.

10. The computer program product of claim 6, wherein the use case is correlated with a distinct pattern of accessing the fetched data, wherein the data being fetched by the ORM framework comprises an object in an object hierarchy of the application, and wherein monitoring the data being fetched includes monitoring a context in which the data is being fetched, wherein the context comprises a parent of the object in the object hierarchy.

11. A system, comprising:
one or more computer processors; and
a memory containing a program, which when executed by the one or more computer processors is configured to perform an operation comprising:

monitoring, during execution of an application that accesses a relational database using an object-relational mapping (ORM) framework, activity comprising: (i) fetching of data from the relational database by the ORM framework for a use case of the application and (ii) accessing of the fetched data by the use case of the application, wherein the use case represents a unit of work performed by the application;

determining, based on the monitored activity, at least a subset of the data being fetched by the ORM framework, that is not used by the application, wherein the subset comprises one or more nodes in an object hierarchy of the application; and configuring the ORM framework without having to restart the application, to fetch data for the one or more nodes in the object hierarchy only upon a request from the application to access the one or more nodes.

12. The system of claim 11, wherein the ORM framework is configured only upon determining that the subset constitutes a threshold percentage of the data, wherein the threshold percentage is a user-configurable value.

13. The system of claim 11, wherein the operation further comprises:
identifying a plurality of use cases of the application;
wherein the use case is selected from the plurality of use cases of the application, wherein at least one of the plurality of use cases is identified based on a stack trace of the application.

14. The system of claim 13, wherein the stack trace of the application comprises a stack trace of a function call to open a session, wherein the session corresponds to a logical grouping of data access operations of the application, wherein the logical grouping is specified by a developer of the application.

15. The system of claim 11, wherein the use case is correlated with a distinct pattern of accessing the fetched data, wherein the data being fetched by the ORM framework comprises an object in an object hierarchy of the application, and wherein monitoring the data being fetched includes monitoring a context in which the data is being fetched, wherein the context comprises a parent of the object in the object hierarchy.

16. A computer-implemented method, comprising:
monitoring, during execution of an application that accesses a relational database using an object-relational mapping (ORM) framework, activity comprising: (i) fetching of data from the relational database by the ORM framework for a use case of the application and (ii) accessing of the fetched data by the use case of the application, wherein the use case represents a unit of work performed by the application;

determining, based on the monitored activity, at least a subset of the data being used by the application, that is fetched by the ORM framework using a plurality of queries, wherein the subset comprises one or more nodes in an object hierarchy of the application; and configuring the ORM framework by one or more computer processors and without having to restart the application, to fetch data for the one or more nodes in the object hierarchy using a single query and prior to any request from the application to access the one or more nodes.

17. A computer program product comprising a computer-readable memory having computer-readable program code embodied therewith, the computer-readable program code comprising:

computer-readable program code configured to monitor, during execution of an application that accesses a relational database using an object-relational mapping (ORM) framework, activity comprising: (i) fetching of data from the relational database by the ORM framework for a use case of the application and (ii) accessing of the fetched data by the use case of the application, wherein the use case represents a unit of work performed by the application;

computer-readable program code configured to determine, based on the monitored activity, at least a subset of the data being used by the application, that is fetched by the ORM framework using a plurality of queries, wherein the subset comprises one or more nodes in an object hierarchy of the application; and computer-readable program code to configure the ORM framework by one or more computer processors when executing the computer-readable program code and without having to restart the application, to fetch data for the one or more nodes in the object hierarchy using a single query and prior to any request from the application to access the one or more nodes.

18. A system, comprising:
one or more computer processors; and
a memory containing a program, which when executed by the one or more computer processors is configured to perform an operation comprising:
  monitoring, during execution of an application that accesses a relational database using an object-relational mapping (ORM) framework, activity comprising: (i) fetching of data from the relational database by the ORM framework for a use case of the application and (ii) accessing of the fetched data by the use case of the application, wherein the use case represents a unit of work performed by the application;
  determining, based on the monitored activity, at least a subset of the data being used by the application, that is fetched by the ORM framework using a plurality of queries, wherein the subset comprises one or more nodes in an object hierarchy of the application; and
  configuring the ORM framework without having to restart the application, to fetch data for the one or more nodes in the object hierarchy using a single query and prior to any request from the application to access the one or more nodes.

\* \* \* \* \*